United States Patent

[11] 3,576,300

| [72] | Inventor | Jack Palfreyman<br>Tansley, near Matlock, England |
|---|---|---|
| [21] | Appl. No. | 844,065 |
| [22] | Filed | July 23, 1969 |
| [45] | Patented | Apr. 27, 1971 |
| [73] | Assignee | Rolls-Royce Limited<br>Derby, England |
| [32] | Priority | Aug. 1, 1968 |
| [33] | | Great Britain |
| [31] | | 36876/68 |

[54] AIRCRAFT
5 Claims, 2 Drawing Figs.

[52] U.S. Cl. .................................................. 244/36,
244/1, 244/55
[51] Int. Cl. .................................................. B64c 1/00

[50] Field of Search............................................ 244/36,
123, 136, 55, 1 (N), 42 (BCC)

[56]  References Cited
UNITED STATES PATENTS
2,994,493  8/1961  Hartman ..................... 244/36(X)
FOREIGN PATENTS
1,168,084  12/1958  France ........................ 244/36

Primary Examiner—Milton Buchler
Assistant Examiner—Carl A. Rutledge
Attorney—Cushman, Darby & Cushman ABSTRACT: An aircraft with good noise characteristics has a number of rear-mounted engines which are arranged to suck boundary layer air from the top of the fuselage to convert the latter in its entirety to a lifting body. The tail of the aircraft acts as a noise shield.

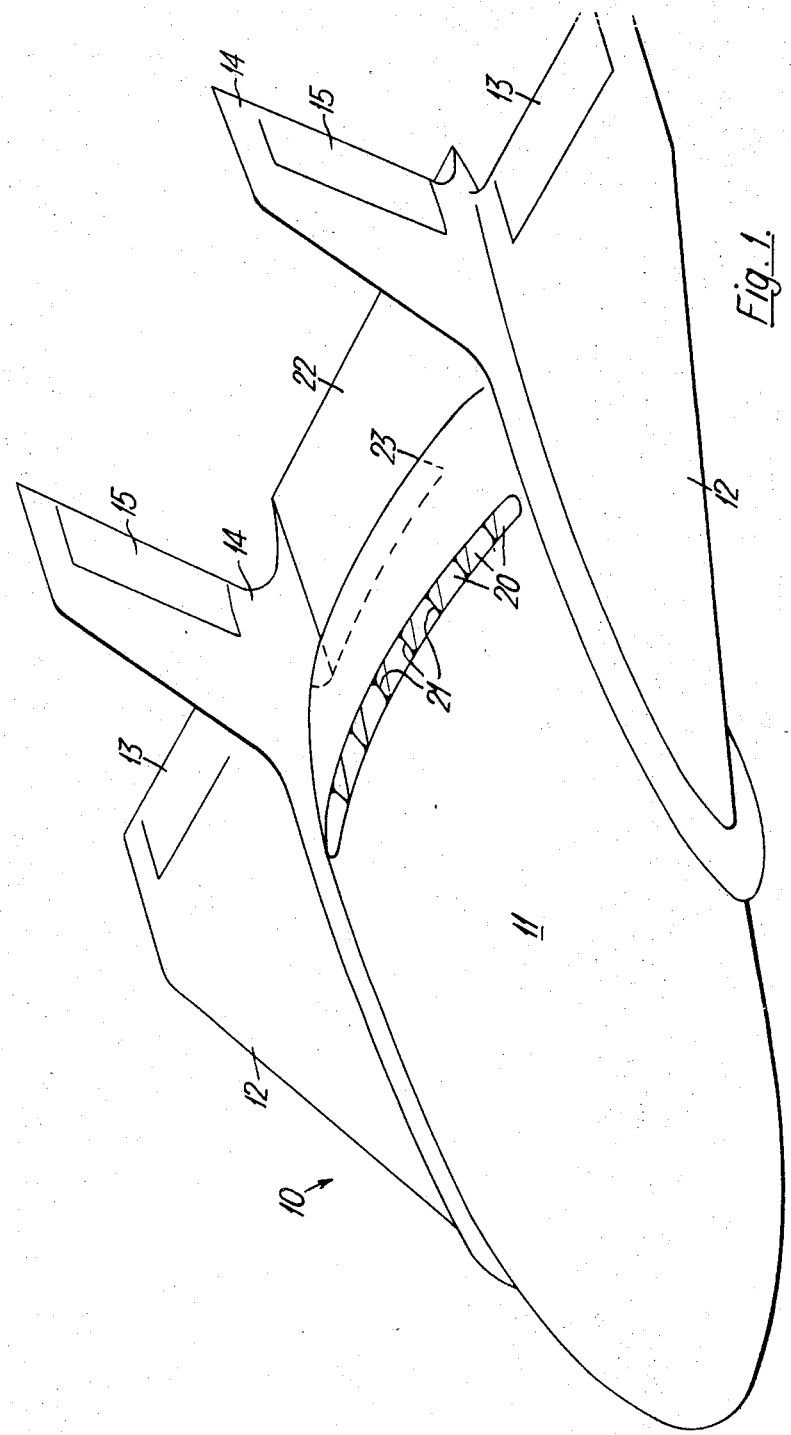

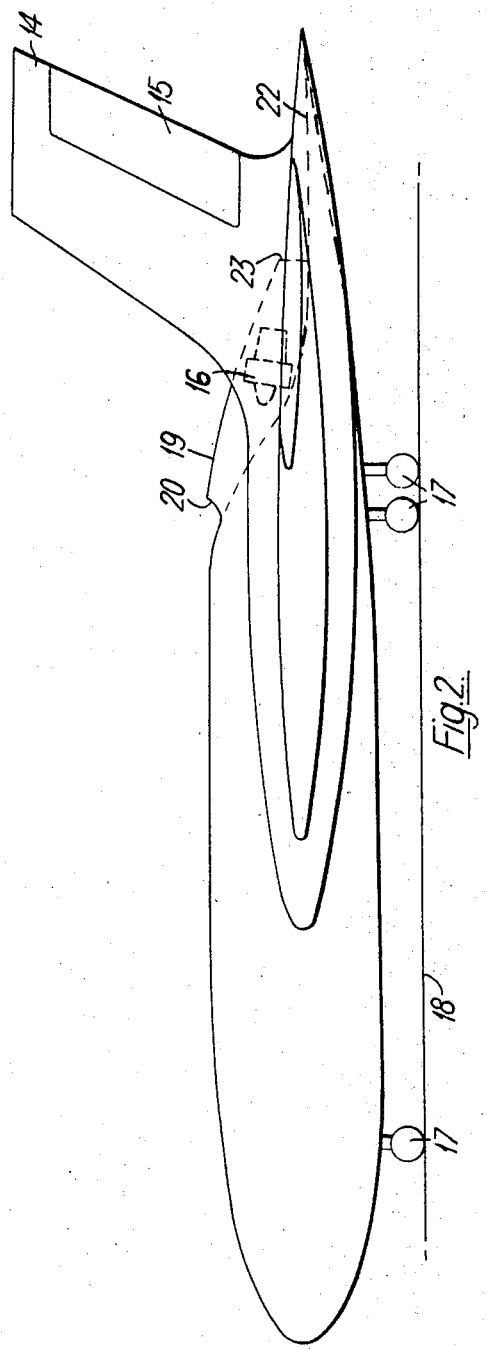

AIRCRAFT

This invention concerns improvements relating to aircraft.

According to the present invention, there is provided aircraft having a fuselage and wings, at least the fuselage having a plurality of longitudinally extending ducts therein and arranged at the rear thereof, the upstream end of each duct being located at the top surface of the fuselage. A gas turbine jet propulsion engine is mounted in each duct to suck air from the top surface of the fuselage so as to cause at least a major part of the fuselage to act as a lifting body. A platform extends rearwardly from and is disposed immediately adjacent to the fuselage, the platform being positioned beneath the downstream ends of the ducts and thus the jet gases effluxing from the engines, flows over the platform and the groundward spread of noise therefrom is reduced.

In a preferred embodiment, there is provided a battery of said engines mounted side by side such that said upstream ends of said ducts extend substantially completely across said fuselage.

The or each engine may be a front fan engine.

Advantageously, the upstream end of the or each duct is upwardly curved with respect to the longitudinal axis of the fuselage.

In an alternative embodiment of the invention, the top surface of said fuselage is substantially coplanar with the top surfaces of the wings, there being a plurality of said engines mounted side by side substantially completely across the wingspan of the aircraft.

The invention will be illustrated, merely by way of example, with reference to the accompanying drawings, in which:

FIG. 1 is a general perspective view of an aircraft in accordance with the present invention, and Fig. 2 is a side elevation of the aircraft shown in FIG. 1.

Throughout this specification works referring to directions such as "above", "below", "vertical", "horizontal", etc., are intended to mean directions as seen in the drawings and in normal attitude of the aircraft.

Referring to the drawings, there is shown an aircraft 10 having a fuselage 11, a pair of opposite wings 12 having respective trailing edge wing flaps 13 and a tail unit including a pair of transversely spaced apart substantially vertical fins 14 each carrying a horizontal stabilizer 15.

The aircraft 10 is provided with a plurality of front fan gas turbine jet propulsion engines 16 for forward propulsion of the aircraft, the engines 16 being mounted side by side and extending substantially completely across the fuselage 11.

As can be seen from FIG. 2, which shows the aircraft with its wheels 17 resting on the ground 18, each gas turbine jet propulsion engine 16 is mounted in a duct 19 shown in part by dotted lines. It is, of course, to be understood that in a normal side elevation the engines 16 and most of the ducts 19 could not be seen. The upstream end 20 of each of the ducts 19 terminate at the top surface of the fuselage 11, and the various ducts are separated by longitudinally extending walls 21.

It will be seen from FIG. 1 that the engines 16 are mounted with the respective upstream ends of their intakes 20 towards the rear of the fuselage. Accordingly, in operation of the engines, air will be sucked into the ducts 19 from substantially the entire top surface of the fuselage 11, including boundary layer air, whereby drag is substantially reduced and at least the major part of the fuselage 11 will act as a lifting body.

As can be seen clearly from the FIGS., a transversely extending platform 22 extends rearwardly of the substantially vertical plane in which the downstream ends 23 of the ducts 19 terminate. It will therefore be appreciated that in operation of the engines 16 the jet effluxes therefrom will flow out rearwardly over the platform 22 before getting detached from the aircraft 10. By virtue of the rearwardly extending platform 22 the noise emanating from the rear of the engines 16 will at least to some extent be prevented from spreading groundwards and thus the platform 22 will act as a noise shield.

A further noise attenuating feature of the illustrated embodiment is connected with the shape of the ducts 19. By virtue of the fact that the upstream portion of each duct 19 is upwardly curved, noise emanating from the front of the respective engine 16 is deflected upwards and away from the ground, and also away from the aircraft 10 itself.

In a further, nonillustrated embodiment of the present invention, an aircraft is provided which has the top surface of its fuselage substantially coplanar with the top surfaces of the wings. The fins are provided at the wing tips and have at their top a tail plane with horizontal trailing edge flaps.

The battery of engines 16 extends substantially completely across the entire wingspan of the aircraft, as does the rearward platform 22.

I claim:

1. In an aircraft having a fuselage and wings, a plurality of longitudinally extending ducts in at least said fuselage and arranged at the rear end thereof, each of said ducts having an upstream end located at the top surface of the fuselage and a downstream end located adjacent the aft end of said fuselage, a gas turbine jet propulsion engine mounted in each of said ducts to suck air from said top surface and to cause at least the major portion of said fuselage to act as a lifting body, and a platform extending rearwardly from and disposed immediately adjacent to said fuselage beneath the downstream end of each of said ducts and over which the jet gas effluxes from the engines flow to reduce groundward spread of noise therefrom.

2. Aircraft as claimed in claim 1 wherein there is a battery of said engines mounted side by side such that said upstream ends of said ducts extend substantially completely across said fuselage in a transverse direction.

3. Aircraft as claimed in claim 1 wherein said at least one engine is a front fan engine.

4. Aircraft as claimed in claim 1 wherein the upstream end of said at least one duct is upwardly curved with respect to the longitudinal axis of the fuselage.

5. Aircraft as claimed in claim 1 wherein the top surface of said fuselage is substantially coplanar with top surfaces of said wings and wherein some of said longitudinally extending ducts are also in said wings, each engine in each of said ducts being mounted side by side with respect to each other substantially completely across the wingspan of the aircraft.